United States Patent [19]

Wood

[11] Patent Number: 4,991,006
[45] Date of Patent: Feb. 5, 1991

[54] APPARATUS USING AN EVERTED HOSE FOR INSPECTING THE INTERIOR OF A LATERAL PIPELINE

[75] Inventor: Eric Wood, Castletown, Great Britain

[73] Assignee: Insituform Licensees, B. V., Amsterdam, Netherlands

[21] Appl. No.: 490,714

[22] Filed: Mar. 8, 1990

[51] Int. Cl.⁵ ............................................. H04N 7/18
[52] U.S. Cl. ..................................... 358/100; 358/93
[58] Field of Search ................... 358/100, 99, 93, 229, 358/106; 254/134.3 FT

[56] References Cited

U.S. PATENT DOCUMENTS 3,764,736 10/1973 Kosky et al. .
3,852,527 12/1974 McQuivey .
4,131,914 12/1978 Bricmont .
4,255,762 3/1981 Takeyasu et al. .
4,281,876 8/1981 Lansberry .
4,432,931 2/1984 Lockett .
4,434,115 2/1984 Chick .
4,532,545 7/1985 Hanson .
4,586,079 4/1986 Cooper, Jr. et al. .
4,651,558 3/1987 Martin et al. .................. 358/100 X
4,677,472 6/1987 Wood .
4,778,553 10/1988 Wood .

FOREIGN PATENT DOCUMENTS 60-38641 2/1985 Japan .

Primary Examiner—Victor R. Kostak
Attorney, Agent, or Firm—James & Franklin

[57] ABSTRACT

A pipeline extending laterally from a main pipeline is inspected from the main line by utilizing an everted hose originally located in the main pipeline to project a TV camera into and along the lateral pipeline.

20 Claims, 5 Drawing Sheets

APPARATUS USING AN EVERTED HOSE FOR INSPECTING THE INTERIOR OF A LATERAL PIPELINE

BACKGROUND OF THE INVENTION

This invention relates to pipeline inspection apparatus and in particular concerns an apparatus for the manipulation of a camera or other examination device along a lateral pipeline.

Specifically, the apparatus is suitable for manipulating a camera to enable it to be inserted into and projected along a lateral pipeline which meets a main pipeline at an angle. A lateral pipeline may be provided, for example, to provide connection between a domestic dwelling and a main sewer or a main gas line. Frequently, there is a need for inspection of the lateral pipeline in order to ascertain its need of repair, or for the purpose of detecting a leak.

There are known TV inspection apparatus which can be inserted in and moved along main pipelines and passageways which are located underground, a TV camera sending back signals to a remotely located monitor, for example, in an inspection truck located at ground level. Wood U.S. Pat. No. 4,677,472 of June 30, 1987, entitled "Apparatus For Inspecting the Interior of a Pipeline", discloses apparatus for enabling the inspection of lateral pipelines or passageways, and in particular for permitting such inspection to be accomplished from the main pipeline. This is important because inserting the inspection camera from the consumer end of the lateral pipeline, i.e., from a domestic dwelling, is in the majority of cases unacceptable to the occupier of the dwelling. That patent discloses a driven pulley-like arrangement for engaging and driving the cable to which the TV camera is connected, thereby pushing the TV camera into and along the lateral pipeline.

It has been found that the apparatus of the aforesaid patent, while effective, is not sufficiently reliable, particularly with regard to the accuracy with which the TV camera is oriented relative to the lateral pipeline and the positiveness of the projection of the TV camera into and along that lateral pipeline. Because lateral pipelines may extend from the main pipeline at varying angles, without accurate initial alignment of the camera the camera will either not enter the lateral pipeline or will enter it in a manner causing it to impact against the wall of that lateral pipeline rather than being pushed through the pipeline opening. In addition, since pipelines often contain impediments to the passage of a camera therethrough, such as accumulations of debris, it may be necessary to exert strong force on the camera to push it through or past such obstructions, and the pulley drive on the camera cable in the apparatus of the aforesaid patent would sometimes slip when there was resistance to the movement of the camera along the lateral line.

SUMMARY OF THE INVENTION

In accordance with the present invention, an improved camera-projecting system is employed which will much more accurately align the camera with the particular lateral line to be inspected and will much more positively and reliably push the camera through that lateral line. It will do this by means of apparatus and equipment much of which is already available in connection with pipe relining operations and with which the working personnel are familiar, so that the cost of carrying out the lateral pipeline inspection from the main pipeline is truly minimized. Close and positive control of the inspection process is enabled, again through the use of equipment and techniques with which the personnel involved are already familiar.

Lateral pipeline inspection is usually carried out in conjunction with the repair of main pipelines by relining them, the lateral pipeline inspection being directed to ascertaining whether there is any necessity to repair the lateral pipelines as well. The most commonly used process for the lining of pipelines and passageways comprises basically the inversion into the pipeline or passageway to be lined of a tubular flexible liner which includes a resin-absorbent material impregnated with curable resin. The flexible liner is held against the surface to be lined by means of fluid pressure, and the resin allowed or caused to cure, so that there is formed a hard resin lining against the passageway or pipeline surface. The process involved is generally described in such patents as Wood U.S. Pat. No. 4,009,063 of Feb. 22, 1977 entitled "Method of Lining a Pipe" and Wood U.S. Pat. No. 4,064,211 of Dec. 20, 1977 entitled "Lining of Passageways". This process has been very widely used over the years, and equipment for carrying it out exists and is relatively standardized. The resin-containing tube is inverted by means of fluid pressure, the liner installation equipment containing pumps or the like for developing that pressure and causing the resin-containing tube to be inverted.

In accordance with the present invention, a tube inverted by fluid pressure is utilized as the medium for projecting a TV camera into and through the lateral pipeline. The inverted tube constitutes a readily controllable and positive acting projecting mechanism utilizing for the most part apparatus already available and in place at the relining location. Insofar as inversion is concerned, it is analogous to the resin-impregnated lining used for repair. Accurate orientation of the camera relative to the lateral pipeline is achieved through simple adaptation of already existing cutting apparatus of the type generally disclosed in such patents as Davis et al. U.S. Pat. No. 4,197,908 of Apr. 15, 1980 entitled "Apparatus For Porting a Side Wall of a Conduit From Interiorly Thereof". Each lateral pipeline to be inspected may have its own individual parameters of orientation and length, and the apparatus here disclosed can be readily adapted thereto. A particular feature thereof is that the length of the apparatus to be inserted in the main pipeline need be only a fraction, generally approximately one-half, of the distance along the lateral pipeline that is to be inspected.

It is the prime object of the present invention to devise a significantly improved apparatus for enabling lateral pipelines to be inspected from the main pipeline.

It is a further object of the present invention to devise such an apparatus which facilitates accurate registration of a camera with the particular lateral pipeline to be inspected and which projects the TV camera through that lateral pipeline with a high degree of positiveness and under close control.

It is yet another object of the present invention to provide such apparatus the parts of which are to a large extent already available in connection with pipe relining operations, thereby minimizing capital cost and facilitating operation by personnel already experienced in pipe relining operations.

BRIEF DESCRIPTION OF THE DRAWING

To the accomplishment of the above and to such other objects as may hereinafter appear, the present invention relates to the arrangement of apparatus for inspecting the interior of a lateral pipeline, as defined in the following claims and as described in this specification, taken together with the accompanying drawings, in which

DESCRIPTION OF THE PREFERRED EMBODIMENT

Figure 1:
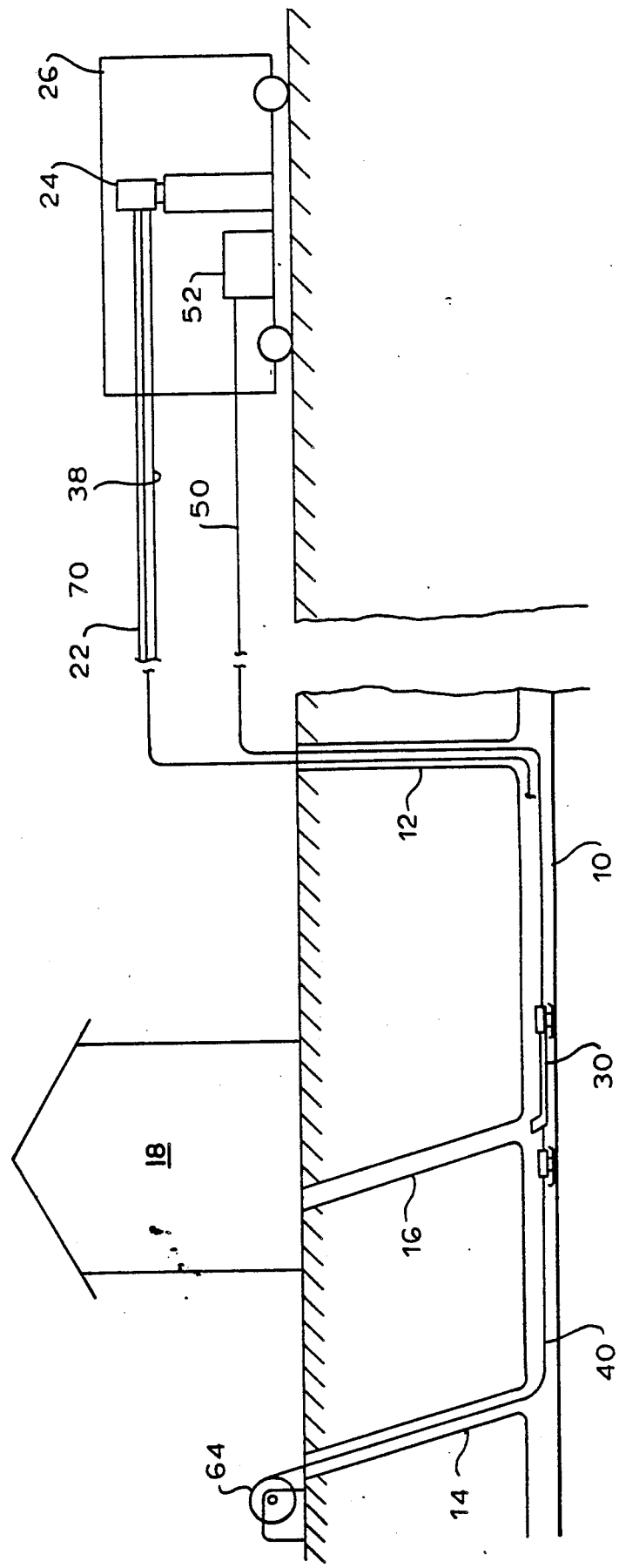
FIG. 1 is a diagrammatic view of a main pipeline and lateral pipelines and the manner in which the apparatus of the present invention is used in conjunction therewith.
Figure 2:
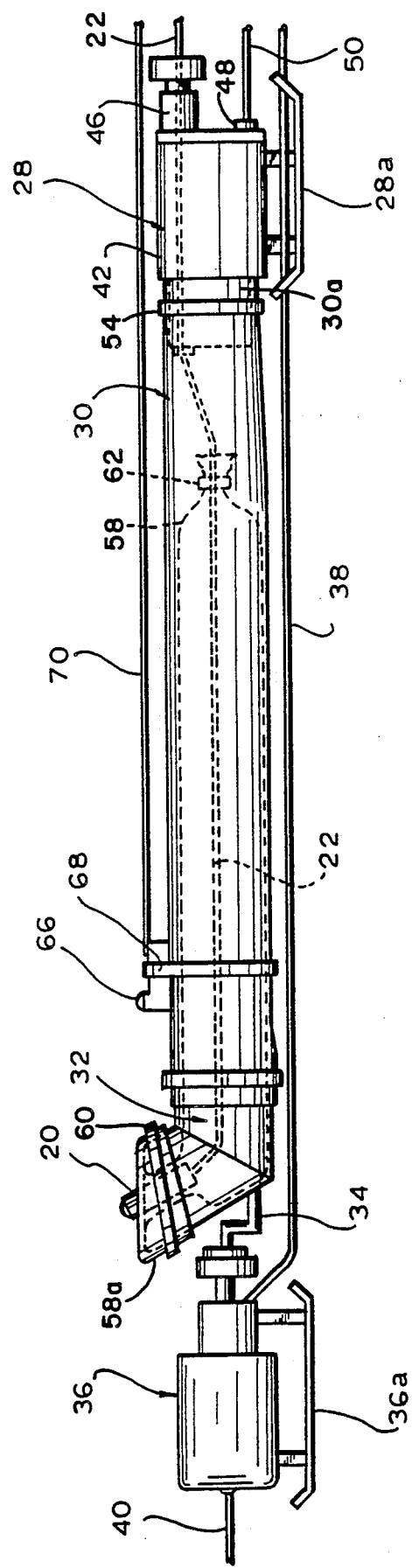
FIG. 2 is a side elevational view of the apparatus of the present invention.

Referring to the drawings, an underground pipeline 10 is shown as extending between upstream and downstream access openings 12 and 14, which may be manhole openings. Communicating with the main pipe 10 is a lateral connecting pipe 16 extending from the main pipeline 10 at an angle and continuing to some remote point, such as the dwelling 18. The objective is to inspect the interior of the lateral pipe 16 from the main pipeline 10. That inspection may be required to determine whether repair of the lateral pipeline 16 is required and what problems may be presented in the course of such repair by obstructions in or discontinuities of that lateral pipeline. That inspection is to be carried out, as is conventional, by a miniature TV camera 20 connected by a cable 22 to a TV monitor 24 located adjacent the upstream manhole 12 and usually contained within a vehicle 26 such as a truck or trailer. The cable 22 preferably has a substantial degree of rigidity, particularly in connection with being axially pushed, although it is capable of bending.

The apparatus for controllably projecting the camera 20 into and along the lateral pipeline 16 after that apparatus has been properly positioned in the main pipeline 10 comprises a pressure cannister assembly generally designated 28 with a flexible hose 30 extending therefrom, and an angled part 32 connected to the forward end of hose 30, the parts 28, 30 and 32 generally defining a conduit. The part 32 is in turn secured to a positioning arm 34 on a remotely controlled locating mechanism 36 which is preferably the locating mechanism of a conventional cutter of the type previously referred to but from which the cutter has been removed. An electrical cable 38 extends from the positioning mechanism 36 to the truck 26 so that the locating mechanism 36 can be remotely controlled. A pulling cable 40 is secured to the forward end of the locating mechanism 36. The pressure cannister 28 and positioning mechanism 36 are mounted on sleds 28a and 36a respectively.

The pressure cannister 28 comprises a pipe body 42 of a diameter less than that of the main pipeline 10 from which a reduced diameter pipe portion 44 extends forwardly, the rear wall of the pressure cannister 28 being closed and carrying a packing gland 46 and a through connection 48 to which an air pressure hose 50 may be connected, the other end of that hose 50 being connected to a pressure pump 52 preferably located in the truck or trailer 26. The hose 30, which may be formed of polyvinyl chloride, has one end 30a received over the pipe portion 44 and sealed thereto by band 54. The angled part 32 is preferably rigid and comprises angled conduit sections 32a and 32b. The angle that the conduit sections 32a and 32b make with one another preferably corresponds reasonably exactly with the angle that the particular lateral pipeline 16 makes with the main pipeline 10, the parts 32a and 32b as specifically disclosed being rigidly related to one another. Under these circumstances different parts 32 will be selectively employed to correspond in angularity to the inclination of the particular pipeline 16 to be inspected. This will involve having available a plurality of parts 32 with different angular relations between 32a and 32b. Alternatively, a single part 32 can be employed in which the sections 32a and 32b are angularly adjustable relative to one another so as to conform to the particular angular orientation of the lateral pipeline 16 in question. The forward end of hose 30 is received over the section 32a and is sealingly secured thereto by band 56. As has been noted, the part 32 is secured to the positioning arm 34 of the locating mechanism 36, which can be controllably moved to adjust the position of the part 32 both axially of the main pipeline 10, rotationally about the axis of the pipeline 10, and radially with respect thereto, so that the section 32b of the part 32 can be accurately aligned and registered with the mouth of the lateral pipeline 16.

Figure 3A:
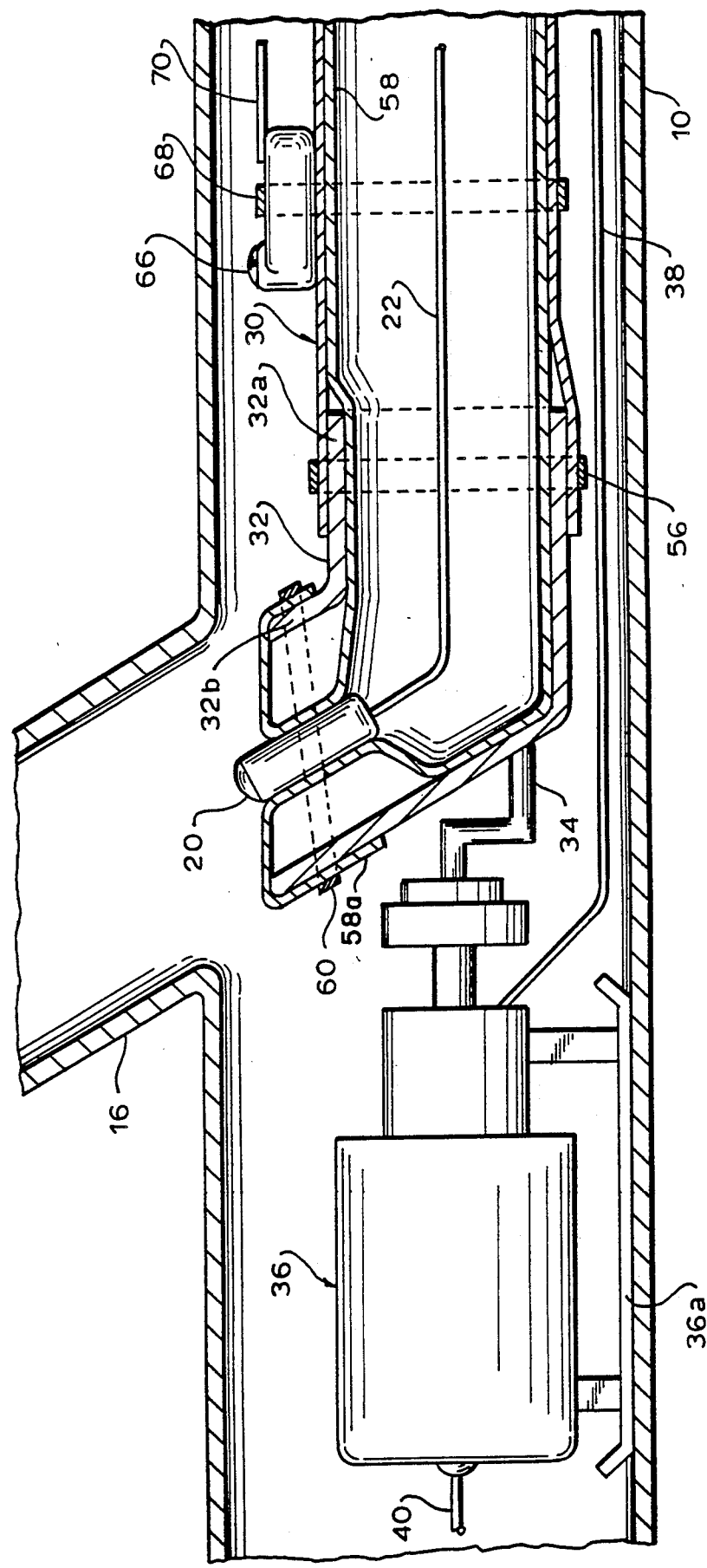
FIGS. 3A and 3B are collectively a cross-sectional view on an enlarged scale of the apparatus of FIG. 2 in position in a main pipeline ready to inspect a lateral pipeline.
Figure 3B:
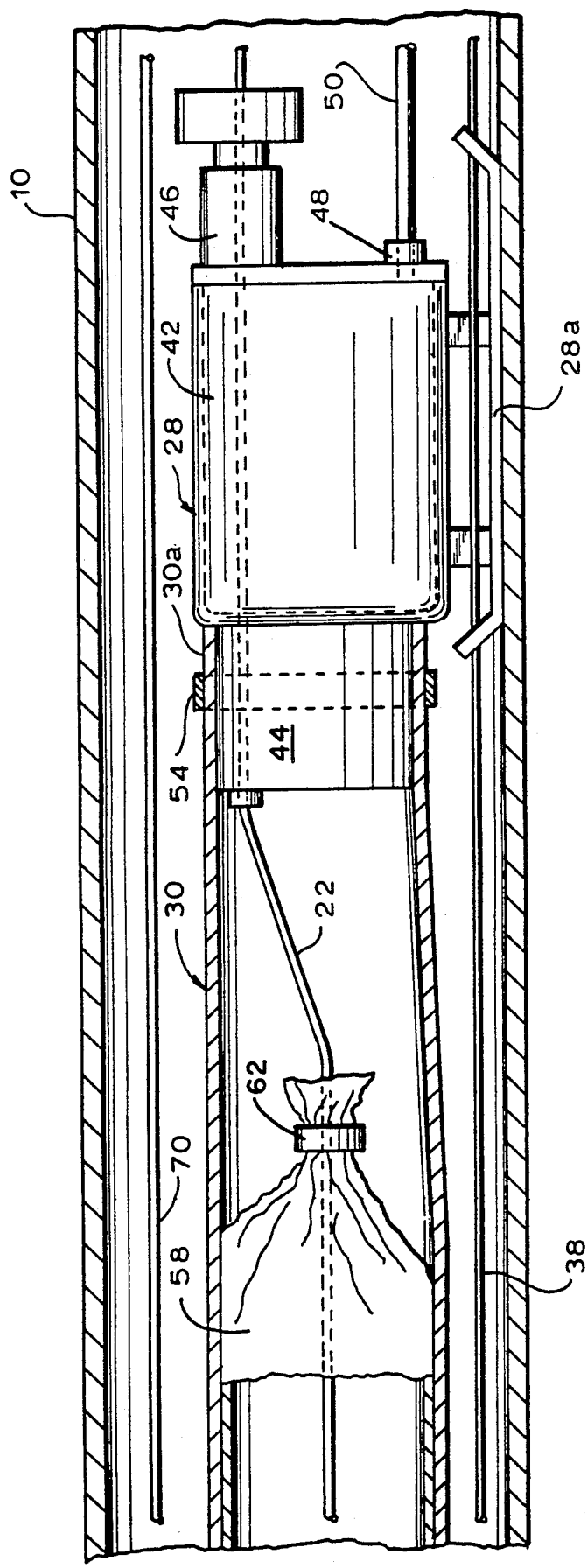
Figure 4:
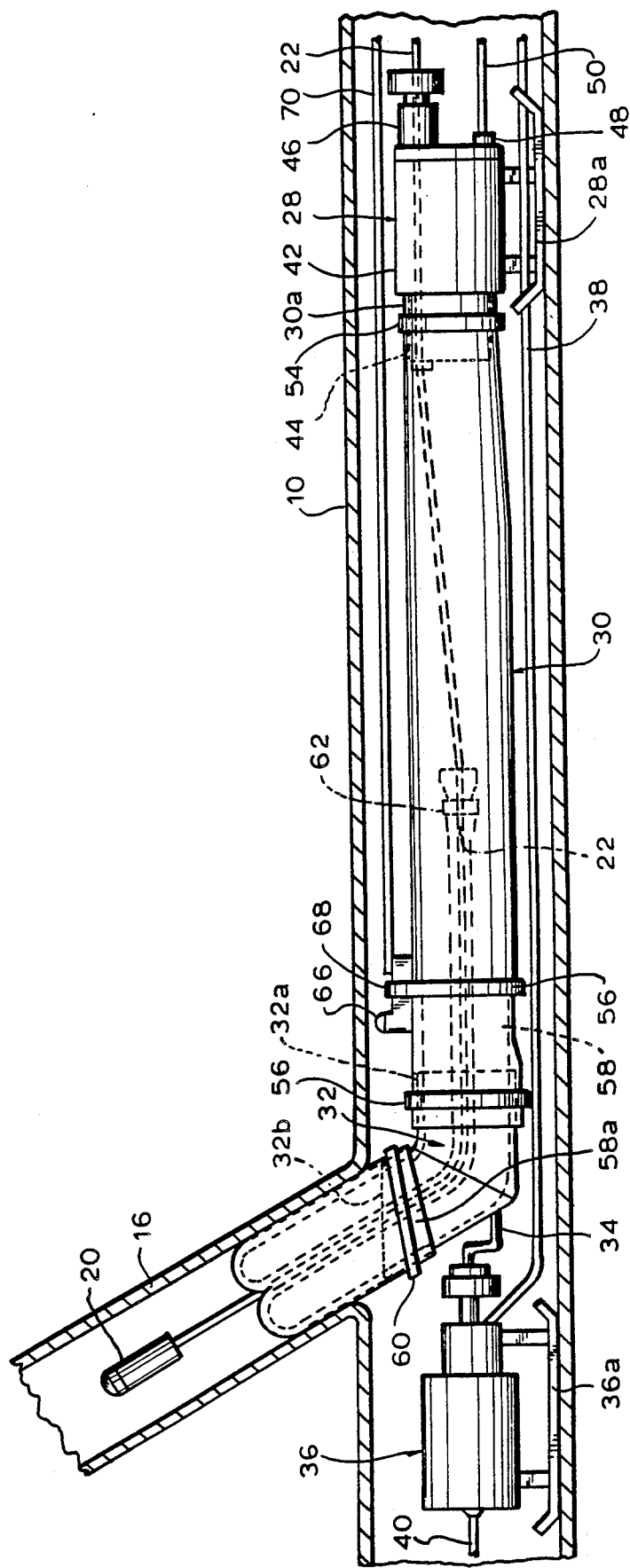
FIG. 4 is a view similar to views 3A and 3B but not cross-sectioned and showing the camera in the course of being moved through the lateral pipeline.

Contained within the hose 30 and part 32 is an evertible hose 58 formed, for example, of neoprene. The lefthand end of the hose 58 extends through the part 32, is bent back thereover at 58a, and is there sealingly secured to the section 32b by band 60. The other end of the hose 58 is located within the hose 30. The TV camera 20 is initially positioned inside the forward end 58a of the hose 58 and its cable 22 extends through the hose 58 and out through the gland 46, through which it is sealingly slidable, up through the access opening 12 to the truck 26, where it is connected to the monitor 24. The trailing or right-hand end of the hose 58 is gathered together and is secured to an intermediate portion of the cable 22 by means of band 62. This is the relationship of parts shown in FIGS. 3A and 3B constituting the inspection mechanism in its initial condition.

That inspection mechanism is inserted into the main pipeline 10 through the access opening 12 and is pulled along the main pipeline 10 by pulling on the cable 40 which extends up through the access opening 14 to a winch 64 until the open end of the part 32 is brought into approximate registration with the mouth of the lateral pipeline 16 to be inspected. A second miniature TV camera 66 is secured to the outside of the forward end of the hose 30 by band 68 and its cable 70 extends to the monitor 24 so that personnel in the truck or trailer 26 can instruct those operating the winch 64 appropriately.

When the apparatus has been positioned with the open end 32b of the part 32 approximately aligned with the mouth of the lateral pipeline 16, the operator in the truck 26 will then energize and control the locating apparatus 36 so as to rotate the part 32, and also preferably move it radially of the main pipeline 10, in order for the TV camera 20 to be more or less accurately aligned with the axis of the lateral pipeline 16.

Then the operator will cause the pump 52 to operate, applying fluid pressure through the tube 50 and the opening 48 into the conduit defined by the interior of the pressure cannister 28, the hose 30 and the part 32. This fluid pressure will be exerted on the left-hand end of the evertible hose 58, causing that hose 58 to invert through the open end of the conduit part 32b. This will pull the right-hand end of the hose 58 to the left until that end reaches the open end of the part 32b and will then further force that hose end outwardly until the hose 58 has been completely everted. As that hose end moves it will move the camera cable 22 along with it, the cable 22 sealingly sliding through the gland 46, and, because the cable 22 has a substantial degree of rigidity at least insofar as axial force is concerned, that will in turn push the camera 20 outwardly from the part 32 into and along the lateral pipeline 16. The speed with which the camera 20 is thus moved, and the force that moves it, are readily controlled by controlling the pressure developed by the pump 52 and by restraining the speed of movement of the camera cable 22 in any appropriate manner. Because the eversion of the hose 58 is positive in nature and the camera cable 22 is rigidly connected thereto, the TV camera 20 is positively moved through the lateral pipeline 16.

Since eversion causes the right-hand end of the hose 58 to move through a distance twice the length of the hose 58, it is only necessary that the hose 58 have a length one-half that of the length of the lateral pipe 16 to be inspected.

The locating mechanism 36 and the pressure cannister assembly 28 may be used for all inspections. Hoses 30 and 58, each of a length appropriate to the particular pipe length or lengths to be inspected, may be connected thereto aboveground, and the appropriately angularly oriented part 32 may also be attached aboveground. The entire inspection assembly may readily be inserted into the main pipeline 10, particularly in view of the fact that the hoses 30 and 58 are readily flexible. It is a simple matter to pull that assembly through the pipeline 10 to its proper position by operating the winch 64 while observing the monitor 24, after which the final precision positioning of the camera 20 relative to the lateral pipeline 16 is further controllably accomplished. The camera 20 may then be positively and forcefully pushed through the lateral pipeline 16 and its interior observed on the monitor 24, which reflects the viewing of the camera 20.

After the lateral pipeline 16 has been inspected the camera 20 may be withdrawn into the inspection apparatus simply by pulling back on the camera cable 22. It is desirable to maintain some air pressure (1-2 psi) during the camera removal from the lateral pipeline 16 to avoid bunching of the neoprene hose 58.

The same apparatus can be used sequentially to inspect a plurality of lateral pipelines 16, provided that the angular orientations of those lateral pipelines with respect to the main pipeline 10 do not depart radically from one another, simply by sequentially moving the inspection apparatus along the main pipeline 10 from one lateral pipeline 16 to the next and realigning the part 32 around the axis of the main pipeline 10 to correspond to the orientation of that particular lateral pipeline 16.

When the length of a particular lateral pipeline 16 is not known with sufficient precision, that length can be measured by marking the camera cable 22 when the camera 20 is about to enter the lateral pipeline and when it has reached the end thereof, and then measuring the distance between those marks.

It will be apparent from the above that a relatively standardized apparatus utilizing conventional and for the most part already available parts is easily assembled, equally easily inserted into a main pipeline through a manhole access or the like, and provides for readily controlled and positively acting propulsion of an inspection camera through a lateral pipeline from a main pipeline, thereby making it unnecessary to have access to the outlet of that lateral pipeline in order to carry out the inspection.

While there has been here disclosed but a single embodiment of the present invention, it will be apparent that many variations may be made therein, all within the scope of the instant invention as defined in the following claims.

I claim:

1. Apparatus for inspecting a lateral pipe from a main pipe, said apparatus comprising a support adapted to be moved along said main pipe to the location of said lateral pipe, a conduit on said support for movement with said support into substantial registration with said lateral pipe, a camera with a cable operatively connected thereto, and a carrier hose, said carrier hose extending through said conduit with its leading end sealingly secured to the leading end of said conduit and its trailing end within said conduit, said camera cable extending from an external station along said carrier hose with said camera located adjacent the leading end of said carrier hose and with the trailing end of said carrier hose secured to said cable, and means for exerting fluid pressure between said carrier hose and said conduit while said camera and camera cable are permitted to move forwardly relative to said conduit, whereby said exertion of fluid pressure everts said carrier hose forwardly from said conduit and causes said camera with its cable to be projected out from said conduit into and along said lateral pipe.

2. The apparatus of claim 1, in which the leading portion of said conduit comprises a substantially rigid angled portion the angle of which at least approximately corresponds to the inclination of said lateral pipe relative to said main pipe.

3. The apparatus of claim 1, in which the leading portion of said conduit comprises a substantially rigid angled portion the angle of which at least approximately corresponds to the inclination of said lateral pipe relative to said main pipe, the trailing portion of said conduit being of a length at least substantially equal to half the length of said lateral pipe desired to be inspected.

4. The apparatus of claim 1, in which the leading portion of said conduit comprises a substantially rigid angled portion the angle of which at least approximately corresponds to the inclination of said lateral pipe relative to said main pipe, the trailing end of said conduit being substantially sealed by a gland through which said camera cable slidably passes.

5. The apparatus of claim 1, in which the leading portion of said conduit comprises a substantially rigid angled portion the angle of which at least approximately corresponds to the inclination of said lateral pipe relative to said main pipe, the trailing portion of said conduit being of a length at least substantially equal to half the length of said lateral pipe to be inspected, the trailing end of said conduit being substantially sealed by a gland through which said camera cable slidably passes.

6. The apparatus of claim 1, in which the leading portion of said conduit comprises an angled portion the angle of which at least approximately corresponds to the inclination of said lateral pipe relative to said main pipe.

7. The apparatus of claim 1, in which the leading portion of said conduit comprises an angled portion the angle of which at least approximately corresponds to the inclination of said lateral pipe relative to said main pipe, the trailing portion of said conduit being of a length at least substantially equal to half the length of said lateral pipe desired to be inspected.

8. The apparatus of claim 1, in which the leading portion of said conduit comprises an angled portion the angle of which at least approximately corresponds to the inclination of said lateral pipe relative to said main pipe, the trailing end of said conduit being substantially sealed by a gland through which said camera cable slidably passes.

9. The apparatus of claim 1, in which the leading portion of said conduit comprises an angled portion the angle of which at least approximately corresponds to the inclination of said lateral pipe relative to said main pipe, the trailing portion of said conduit being of a length at least substantially equal to half the length of said lateral pipe to be inspected, the trailing end of said conduit being substantially sealed by a gland through which said camera cable slidably passes.

10. The apparatus of any of claims 1-9, in which the trailing portion of said conduit comprises a hose.

11. Apparatus for inspecting a lateral pipe from a main pipe, said apparatus comprising a support adapted to be moved along said main pipe to the location of said lateral pipe, a conduit on said support for movement with said support into substantial registration with said lateral pipe, means operatively connected to said conduit for moving its leading end relative to said support for more accurate registration with said lateral pipe, a camera with a cable operatively connected thereto, and a carrier hose, said carrier hose extending through said conduit with its leading end sealingly secured to the leading end of said conduit and its trailing end within said conduit, said camera cable extending from an external station along said carrier hose with said camera located adjacent the leading end of said carrier hose and with the trailing end of said carrier hose secured to said cable, and means for exerting fluid pressure between said carrier hose and said conduit while said camera and camera cable are permitted to move forwardly relative to said conduit, whereby said exertion of said fluid pressure everts said carrier hose forwardly from said conduit and causes said camera with its cable to be projected out from said conduit into and along said lateral pipe.

12. The apparatus of claim 11, in which the leading portion of said conduit comprises a substantially rigid angled portion the angle of which at least approximately corresponds to the inclination of said lateral pipe relative to said main pipe.

13. The apparatus of claim 11, in which the leading portion of said conduit comprises a substantially rigid angled portion the angle of which at least approximately corresponds to the inclination of said lateral pipe relative to said main pipe, the trailing portion of said conduit being of a length at least substantially equal to half the length of said lateral pipe desired to be inspected.

14. The apparatus of claim 11, in which the leading portion of said conduit comprises a substantially rigid angled portion the angle of which at least approximately corresponds to the inclination of said lateral pipe relative to said main pipe, the trailing end of said conduit being substantially sealed by a gland through which said camera cable slidably passes.

15. The apparatus of claim 11, in which the leading portion of said conduit comprises a substantially rigid angled portion the angle of which at least approximately corresponds to the inclination of said lateral pipe relative to said main pipe, the trailing portion of said conduit being of a length at least substantially equal to half the length of said lateral pipe desired to be inspected, the trailing end of said conduit being substantially sealed by a gland through which said camera cable slidably passes.

16. The apparatus of claim 11, in which the leading portion of said conduit comprises an angled portion the angle of which at least approximately corresponds to the inclination of said lateral pipe relative to said main pipe.

17. The apparatus of claim 11, in which the leading portion of said conduit comprises an angled portion the angle of which at least approximately corresponds to the inclination of said lateral pipe relative to said main pipe, the trailing portion of said conduit being of a length at least substantially equal to half the length of said lateral pipe desired to be inspected.

18. The apparatus of claim 11, in which the leading portion of said conduit comprises an angled portion the angle of which at least approximately corresponds to the inclination of said lateral pipe relative to said main pipe, the trailing end of said conduit being substantially sealed by a gland through which said camera cable slidably passes.

19. The apparatus of claim 11, in which the leading portion of said conduit comprises an angled portion the angle of which at least approximately corresponds to the inclination of said lateral pipe relative to the main pipe, the trailing portion of said conduit being of a length at least substantially equal to half the length of said lateral pipe desired to be inspected, the trailing end of said conduit being substantially sealed by a gland through which said camera cable slidably passes.

20. The apparatus of any of claims 11-19, in which the trailing portion of said conduit comprises a hose.

* * * * *